United States Patent [19]

Luginbuhl

[11] 3,712,779
[45] Jan. 23, 1973

[54] POSITION ADJUSTING BAR FOR INJECTION MOLDING MACHINE

[75] Inventor: David E. Luginbuhl, Rockville, Conn.

[73] Assignee: Appollo Plastic & Machine Co., Bolton, Conn.

[22] Filed: Jan. 25, 1971

[21] Appl. No.: 109,380

[52] U.S. Cl. .................................. 425/242, 425/411
[51] Int. Cl. .................................................. B29f 1/00
[58] Field of Search ....... 18/30 WM, 30 WP, 30 WC, 18/30 LM, 42 D, 16 R, 16 H; 83/700; 425/242, 338, 411

[56] References Cited

UNITED STATES PATENTS 3,197,825   8/1965   Hammond .................... 18/42 D X
2,601,341   6/1952   Stacy .............................. 18/16 R X
1,476,782   12/1923  Wagner ........................... 18/16 R
3,104,433   9/1963   Hoern .............................. 425/242 X

FOREIGN PATENTS OR APPLICATIONS 343,121     1/1960   Switzerland .................... 18/42 D Primary Examiner—J. Spencer Overholser
Assistant Examiner—David S. Safran
Attorney—Prutzman, Hayes, Kalb & Chilton

[57] ABSTRACT

A position adjusting bar is provided for the movable mold block of a vertical platen injection molding machine. The position adjusting bar is a U-shaped member secured to the movable platen for travel therewith and includes vertically adjustable linkages connected to the movable mold block for raising and lowering the block relative to the bar, thereby effecting accurate and positive alignment between the stationary and movable mold blocks.

6 Claims, 1 Drawing Figure

PATENTED JAN 23 1973
3,712,779
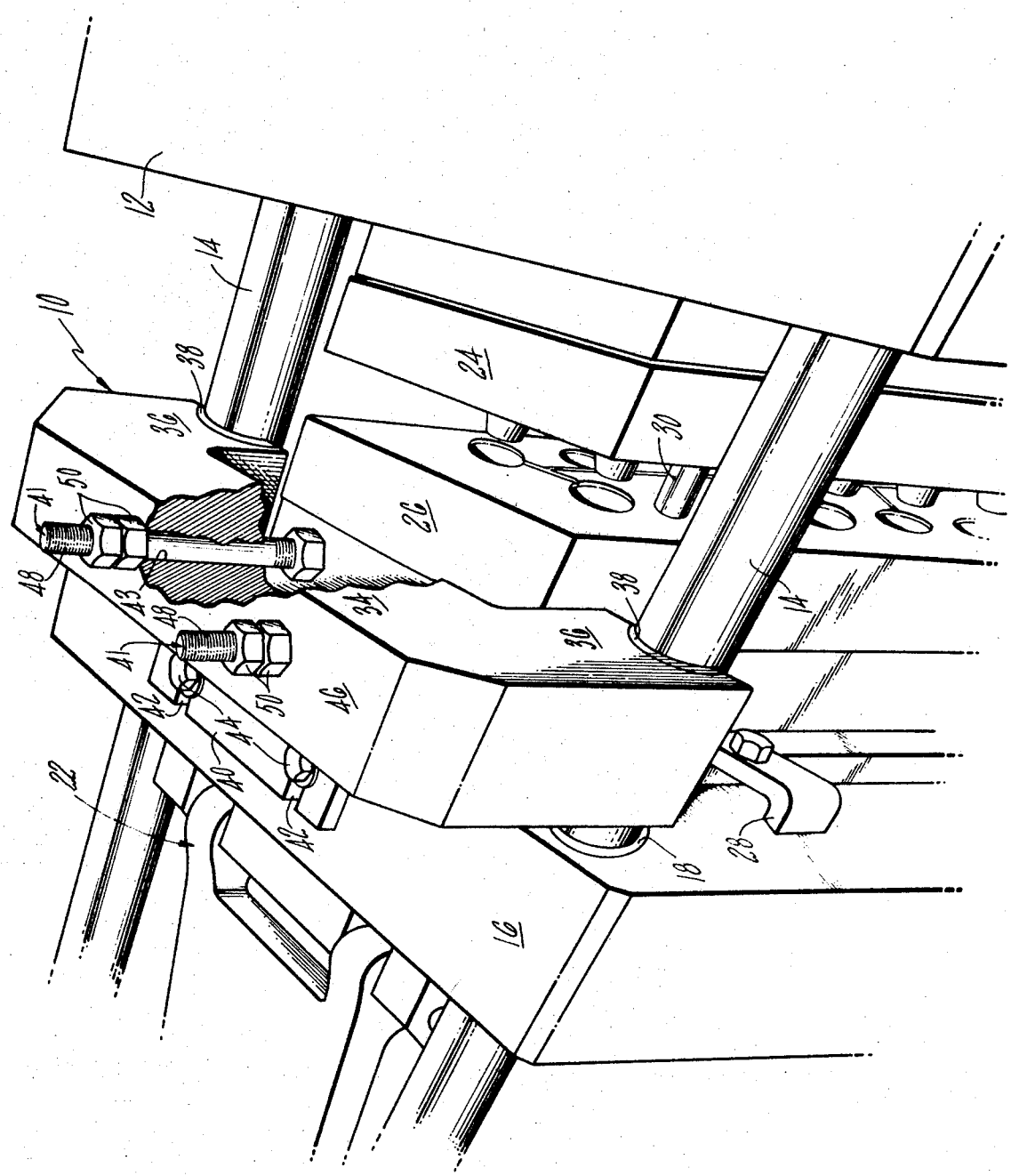
INVENTOR
DAVID E. LUGINBUHL
BY Prutzman, Hayes, Kalb and Chilton
ATTORNEYS

POSITION ADJUSTING BAR FOR INJECTION MOLDING MACHINE

BACKGROUND AND SUMMARY OF THE INVENTION

The present invention relates generally to injection molding and is more particularly concerned with a new and improved position adjusting bar for precisely aligning the separable mold portions of an injection molding machine.

Although some injection molding machines have been designed to utilize horizontally disposed platens, the preferred and more conventional vertical platens have experienced far greater success. In such machines the movable portion of the mold is carried on tie rods or similar supporting units for movement toward and away from the stationary mold block between its open and closed positions. One of the mold blocks usually carries a number of leader pins which are received within suitable apertures in the confronting mold portion for assisting in the proper alignment of the mold as the platens are moved into their closed position. Unfortunately the constant heating and cooling of the mold frequently causes slight distortions of the leader pin and these distortions are further aggravated in vertical platen machines by the constant abrasive action occurring during the opening and closing operation of the mold. This action together with the natural wear on the tie rods and platen bushings can result in cavity mismatch between the blocks and eventually necessitates replacement of the entire mold long prior to the end of its useful life. Unfortunately, attempts to correct such a mismatch when the mold is cold have lacked true precision and variations occurring under operating conditions could not be corrected without interrupting production.

Accordingly, it is an object of the present invention to provide a new and improved position adjustment bar for a movable mold block of an injection molding machine capable of rapid and facile assembly on existing injection molding equipment for obviating the wear effects heretofore experienced on the leader pins, tie rod, platen bushings and the like. Included in this object is the provision for a new and improved mold block adjustment member for use with vertical platens to accurately position the moving mold block either prior to movement of the mold into its closed position or while the mold is in its closed position and under operating conditions.

Another object of the present invention is to provide a new and improved position adjusting bar of simple design yet durable and sturdy construction capable of being installed on existing injection molding machines with little or no alteration therein yet effective for substantially prolonging the useful life of the mold.

Other objects will be in part obvious and in part pointed out in more detail hereinafter.

These and related objects are accomplished in accordance with the present invention by providing a new and improved position adjusting bar for the movable mold block of a vertical platen injection molding machine wherein the bar comprises an elongated body portion overlying the movable mold block, fixed leg portions depending from the body portion and mounted on a support for the movable block for movement with the block along its line of travel between its open and closed positions, and adjustable linking means engaging the movable mold block and the adjusting bar for raising and lowering the movable block relative to the bar within a plane intersecting the block's line of travel between its open and closed positions.

A better understanding of the objects, advantages, features, properties and relationships of the invention will be obtained from the following detailed description and accompanying drawing which set forth an illustrative embodiment and are indicative of a way in which the principles of the invention are employed.

BRIEF DESCRIPTION OF THE DRAWING

The drawing is a perspective view partially broken away of a mounted injection mold with a position adjustment bar of the present invention secured thereto.

DESCRIPTION OF A PREFERRED EMBODIMENT

Referring now to the drawing in greater detail, one embodiment of the position adjustment bar 10 of the present invention is shown mounted on an injection molding machine of the vertical platen type. As shown, the machine generally comprises a vertically disposed stationary platen 12, a pair of tie rods 14 extending outwardly from the stationary platen in spaced parallel relationship and a movable platen 16 slidably mounted on the tie rods 14 by means of bushings 18 for reciprocal movement toward and away from the stationary platen 12. A suitable drive mechanism, including the linkage partially shown at 22, is effective for driving the movable platen 16 between its open and closed positions. Complementary mold blocks 24, 26 are suitably secured to confronting faces of their respective platens such as by clamping members 28 so that at least substantial cavity alignment is effected when the platens are moved to a closed position. A plurality of leader pins 30 are carried by the movable mold block 26 and are received within corresponding apertures (not shown) in the stationary mold block 24 for assisting in appropriate alignment of the mold as the blocks are moved into their closed positions.

In accordance with the present invention, a higher degree of alignment precision is achieved and retained by use of a position adjusting bar. In the embodiment illustrated the bar 10 is shown as a solid sturdy member of generally U-shaped yoke-like configuration. The bar consists of an elongated central body portion 34 fully traversing the movable mold block 26 for overlying relationship therewith and a pair of depending side arm portions 36 extending at substantially a right angle to the central body portion. The side arm portions are shown as being relatively short but of sufficient length to position the body portion 34 well above the movable mold block 26. The free or terminal end of each side arm is provided with an arcuate recess within which is carried a semi-circular bushing 38 of self-lubricating material such as teflon or the like to facilitate movement of the position adjusting bar along the tie bars 14 with minimal resistance. A generally L-shaped connecting flange 40 secured to the central body portion 34 of the positioning bar is provided with a pair of slots 42 for receiving bolts 44 carried by the platen 16, thereby effecting a secure fixed relationship between the movable platen 16 and the bar 10 and assuring movement of the bar therewith along the line of travel between the mold's open and closed positions.

In the particular embodiment illustrated, vertical adjustment of the movable mold block 26 is effected by means of a pair of adjustment bolts 41 removably yet securely and fixedly fastened to the top of the mold block and extending upwardly therefrom through a pair of spaced apertures 43 in the central body portion 34 of the bar. The bolts 42 protrude substantially above the top surface 46 of the bar's central body portion and are provided with threads 48 on their free ends for receiving the lockable adjustment nuts 50 which bear against the top surface 46 to supportably position the depending mold block 26.

As will be appreciated, the improved position adjustment bar of the present invention can be easily secured to the vertical platen of an existing injection molding machine in a rapid and facile manner without in any way interfering with the operation of the machine. Additionally, a simple yet accurate vertical adjustment can be made in the position of the moving mold block by simply manipulating the adjusting nuts thereby quickly and easily assuring proper alignment between the mold blocks. This easily installed device is particularly advantageous as it enables the operator to correct any slight misalignment while the mold is closed, even during operation of the injection molding machine.

As will be apparent to persons skilled in the art, various modifications, adaptations and variations of the foregoing specific disclosure can be made without departing from the teachings of the present invention.

I claim:

1. In a vertical platen injection molding machine having a stationary mold portion, a complementary mold portion movable horizontally toward and away from the stationary portion along a fixed line of travel between open and closed positions and a support for the complementary mold portion during movement thereof along its line of travel, said support including a pair of horizontally extending tie rods, the improvement comprising a position adjusting bar for preventing cavity mismatch, said bar comprising an elongated body portion overlying the movable mold portion, a pair of spaced leg portions depending from the body portion and adapted for being mounted on said tie rods for movement of the bar along said line of travel, and adjustable linking means engaging said movable mold portion and said bar for suspendably retaining the movable mold portion in a selected position and for adjusting the vertical position of said movable mold portion relative to said bar within a plane intersecting said line of travel to correct cavity mismatch between said mold portions.

2. The combination of claim 1 wherein the elongated body portion and the leg portions form a U-shaped configuration and the linking means suspendably mounts the movable mold on the elongated body portion.

3. The combination of claim 1 wherein the leg portions include bearing means for slidably engaging said tie rods and facilitating movement of the bar along the line of travel with the movable mold portion.

4. The combination of claim 1 wherein the adjustable linking means is fixedly secured to the movable mold portion for movement therewith.

5. The combination of claim 4 wherein the adjustable linking means includes threaded members secured to the movable mold portion and means cooperating with said threaded members to effect vertical movement of the mold portion relative to the bar within said plane.

6. The combination of claim 1 including a connector for fixedly connecting the bar to the movable mold portion for movement therewith along its line of travel.

* * * * *